Patented Mar. 6, 1923.

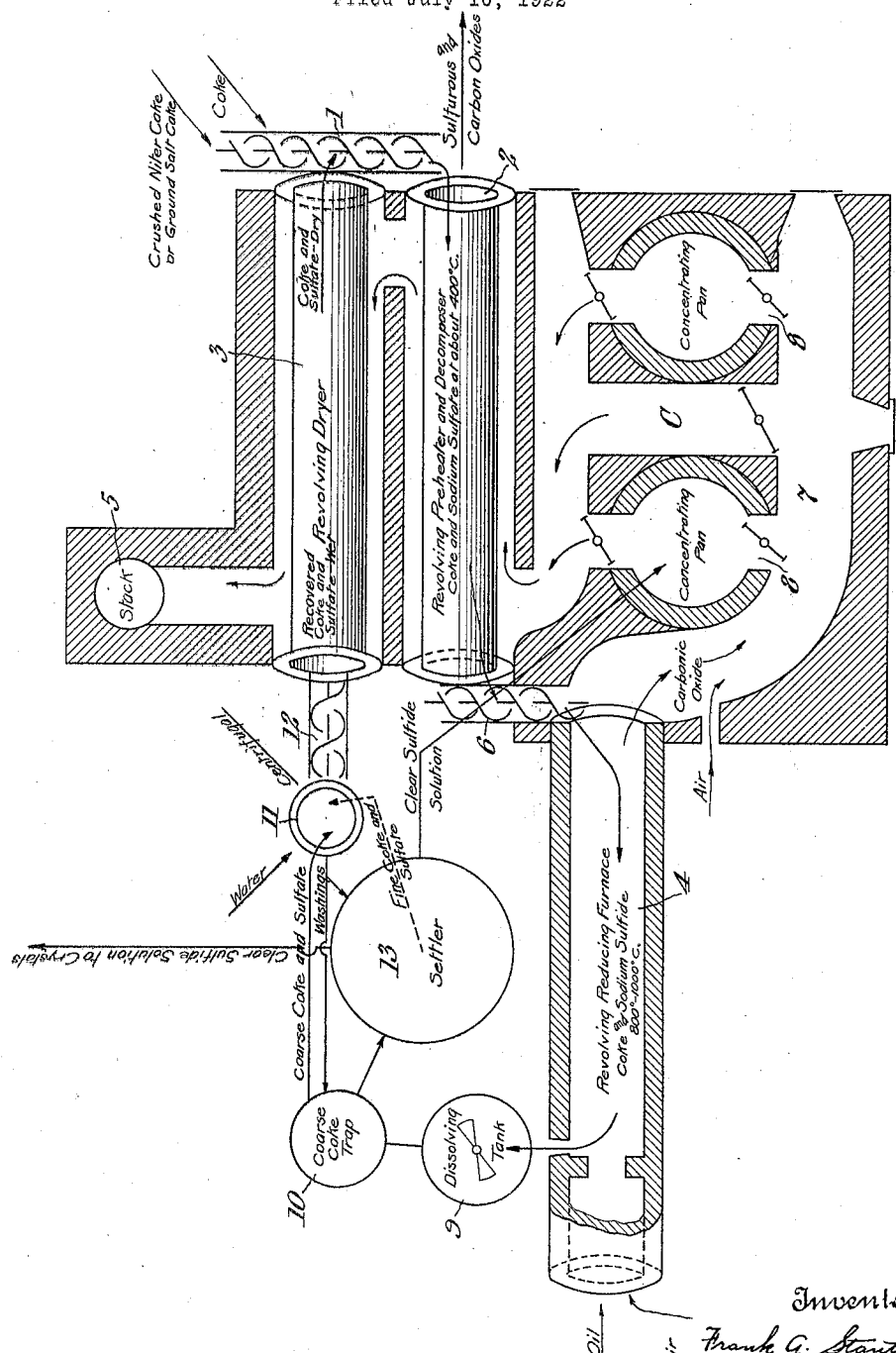

1,447,524

UNITED STATES PATENT OFFICE.

FRANK G. STANTIAL, OF MELROSE, AND JOHN H. CLARKE, OF WINCHESTER, MASSACHUSETTS, ASSIGNORS TO MERRIMAC CHEMICAL COMPANY, OF WOBURN, MASSACHUSETTS, A CORPORATION OF MASSACHUSETTS.

PROCESS OF MAKING SODIUM SULPHIDE.

Application filed July 10, 1922. Serial No. 573,811.

*To all whom it may concern:*

Be it known that we, (1) FRANK G. STANTIAL and (2) JOHN H. CLARKE, citizen of (1) the United States, (2) Canada, subject of the King of Great Britain, residing at (1) 146 Florence Street, Melrose, (2) 273 Main Street, Winchester, in the county of (1) Middlesex, (2) Middlesex, and State of (1) Massachusetts, (2) Massachusetts, have invented certain new and useful Improvements in Processes of Making Sodium Sulphide, of which the following is a specification.

This invention relates to the process for the manufacture of sodium sulphide in which sodium sulfate is reduced to the sulphide by means of a carbonaceous reducing agent.

The usual method of making sodium sulphide comprises heating a mixture of sodium sulfate or sodium acid sulfate and carbonaceous material, such as coal or coke, on the bed of a reverberatory furnace to a temperature of about 1000° C. in a reducing atmosphere produced by burning soft coal, oil, gas or other fuel. In this process the charge is melted or reduced to a semifused mass in order to secure intimate contact between the sulfate and the reducing agent and further to facilitate the rabbling and mixing of the charge. In order to maintain the charge in a fused or plastic condition a temperature considerably above the minimum temperature necessary for reaction between the sulfate and the carbonaceous material must be maintained and this results in loss of heat, loss of material by volatilization and the formation of undesirable impurities. The fused charge acts destructively upon the furnace linings which not only gives rise to heavy maintenance costs but also introduces impurities into the furnace product.

Moreover, for rabbling the charge, hand labor of a very exacting nature is required.

In another process of making sodium sulphide some of the mentioned objectionable features of the usual process are obviated by avoiding fusion of the charge. This process, however, involves a very fine grinding or pulverizing of both the sodium sulfate and the carbonaceous material.

An object of our invention is to avoid the fine grinding or pulverizing of the materials and also to avoid the various disadvantages incident to the use of high temperatures and mass fusion of the charge.

A further object of our invention is the complete utilization of the materials entering into the reaction, that is, the sodium sulfate or sodium acid sulfate and the carbonaceous material.

The process consists generally in reducing sodium sulfate by heating it in intimate contact with granular carbonaceous material, separating the resulting sodium sulphide from unreduced sulfate and unconsumed carbonaceous material, and returning the recovered sulfate and carbonaceous material to the process.

In the following detailed description of the invention reference is made to the accompanying drawing in which the figure is a horizontal view partly in section of one form of apparatus suitable for carrying out the process.

Referring to the drawing, 1 is a conveyor adapted to receive raw crushed niter cake or ground salt cake and coke from a suitable source of supply and also recovered coke and sodium sulfate together with other recovered sodium salts from the revolving dryer 3 and to deliver the material to the revolving preheater and decomposer 2. From the revolving preheater and decomposer 2 the material is delivered to the revolving reducing furnace 4 by way of the conveyor 6. From the reducing furnace 4 the reaction product, consisting principally of unconsumed coke, sodium sulfate and sodium sulphide, passes to apparatus for recovering these materials; the coke and sulfate and other recovered sodium salts being returned to the process with fresh materials and the sodium sulphide being withdrawn as a final product. The furnace product contains sodium salts other than sodium sulfate and sodium sulphide which are separated from the sodium sulphide along with the sodium sulfate and coke and returned to the process. In the following description and claims reference will be made to the three principal constituents of the furnace product only, that is, the unconsumed coke, the unconverted sodium sulfate and the sodium sulphide, it being understood that the other sodium salts present are separated, recovered and returned to the process along with the recovered coke and sodium sulfate. The dissolving and recovery apparatus is illustrated in the drawing more or less diagrammatically. As illustrated the furnace 4 discharges into the dissolving tank 9 in which the material is agitated with water or washings in quantity sufficient or less than sufficient to dissolve the sodium sulphide content. The product of the operation carried out in tank 9 consisting principally of coke, undissolved sodium sulfate with possibly small amounts of undissolved sodium sulphide and a solution of sodium sulphide passes to apparatus for separating coke and sodium sulfate from the sodium sulphide solution. Any suitable form of leaching and displacement apparatus may be used for this purpose but we preferably employ a system such as that illustrated in the drawings. The mixture of coke, undissolved sodium sulfate, and sodium sulphide solution passes from tank 9 to the coarse coke trap 10 in which the coarse coke and the bulk of the sodium sulfate are settled and washed by means of a counter current of water or washings from the centrifugal 11 as indicated, the sodium sulphide solution with some fine coke and sodium sulfate passing to the settler 13 in which substantially complete separation of the coke and undissolved sodium sulfate from the sodium sulphide solution is accomplished, the settled material being washing by a counter current flow of water or washings from the centrifugal 11 as indicated. The clear sodium sulphide solution formed in the settler 13 is withdrawn for the recovery of sodium sulphide by crystallization or is conveyed to the concentrating pans 8 or both as indicated. The coarse coke and sodium sulfate separated in the coarse coke trap 10 and the fine coke and sulfate separated in the settler 13 are discharged into the centrifugal 11 where they are washed with water, the wash water supplying the coarse coke trap 10 and the settler 13 as indicated. The washing of the recovered coke and sulfate preferably is accomplished by charging the centrifugal 11 periodically with coarse coke and sulfate from the trap 10 and then with fine coke and sulfate from the settler 13. By operating in this manner the coarse coke and sulfate forms a bed or a sort of sand filter upon which the fine coke and sulfate is deposited and held while it is being washed. The washed coke and sulfate is delivered from the centrifugal 11 through the conveyor 12 to the revolving dryer 3.

In the above described operation for the recovery of sodium sulphide solutions of maximum concentration are employed in order to secure a more or less complete separation of the sodium sulphide in solution from sodium sulfate in the undissolved residue.

The centrifugal 11 may be replaced by equivalent apparatus such as a suction filter. In practice the apparatus represented by the coke trap 10 and the settler 13 preferably is some approved form of classifiers or series of classifiers and settlers designed for the washing, displacement and separation of solid materials from soluble constituents.

Further details of the apparatus will appear in the following description of the operation of the process.

Carbonaceous material in granular form, preferably a material low in ash content such as petroleum coke and sodium acid sulfate preferably in the form of crushed or coarsely ground niter cake are fed into the conveyer 1 in the proportions of about 1 part of niter cake to 1.5 more or less parts of coke. The proportions of coke and niter cake will vary considerably depending upon the condition of the process and the relative proportions of recovered coke and sodium sulfate being supplied to the conveyor 1 from the dryer 3. The coke and niter cake are supplied in sufficient proportion to maintain in the process a substantial excess of coke over that required for the reduction, the bulk of the coke in the charge being in granular form, say about #8 mesh as distinguished from powdered material.

The charge of coke and niter cake with recovered coke and sulfate is delivered by the conveyor 1 to the revolving preheater and decomposer 2 which is maintained at about 400° C. by waste heat from the furnace 4. In the preheater 2 the niter cake fuses and due to the mixing and tumbling of the charge forms a coating or film upon the coke. No reduction of sulfate to sulphide occurs in the decomposer 2 at the temperature employed but the free acid of the niter cake reacts with the coke forming sulfur dioxid and oxides of carbon. The gas evolved from the decomposer contains as high as from 50 to 65 per cent of sulfur dioxid and may be used in various ways.

The coke, coated with sodium sulfate resulting from the treatment in the decomposer 2 and preheated to the extent of about 40 per cent passes by way of conveyor 6 into the revolving reducing furnace 4 which is maintained at a temperature sufficient to accomplish reduction of the bulk of the sulfate. A temperature between 800° C. and 1000° C. is suitable for this purpose the lower temperature being preferred. The furnace 4 is heated in any suitable manner such as by a reducing flame produced by burning oil with air as indicated.

The gases leaving the furnace 4 are at a high temperature and moreover contain a considerable amount of carbonic oxid. This gas is supplied to the furnace chamber 7 where it is mixed with sufficient air to support complete combustion and the resulting hot gases and products of combustion then pass under the concentrating pans 8, the decomposer 2 and through or around or both around and through the dryer 3 and then to the stack 5 as indicated. Additional fuel may be supplied at any convenient point if the heat supplied to the several parts of the apparatus by the waste gases from furnace 4 is insufficient.

The material discharged from the furnace 4 is treated for the recovery of sodium sulphide and unreduced sodium sulfate and unconsumed coke as described above, the recovered coke and sulfate being delivered to the dryer 3 from which it passes in a dry condition to the conveyor 1.

The apparatus is illustrated and described as being arranged horizontally, conveyors being employed for progressing the solid materials through the apparatus. It is to be understood however, that the invention is not limited in this respect since it will be apparent that the apparatus may be arranged vertically, the solid materials passing through the apparatus by gravity, and the conveyors may be omitted.

In the above described process in which sodium acid sulfate (niter cake) is employed, after the free acid of the niter cake has been decomposed with the production of a gaseous product rich in sulfur dioxid, the sodium sulfate in contact with the coke in the form of thin films is quickly and efficiently reduced to the sulphide at a relatively low temperature without mass fusion. Loss by volatilization, the formation of by-products by long heating and the action of the charge on the furnace linings are thus largely avoided. Since the charge passes through the furnace in a granular condition hand rabbling is unnecessary. The process is largely automatic and rapid, resulting in an excellent yield and relatively large output. Moreover the process is economical in the use of fuel and materials and the expense for apparatus up-keep and labor is small.

In the process described above using niter cake as the starting material the niter cake is fused at the relatively low temperature employed in the decomposer 2 and coats the coke granules, the niter cake coating being converted to sodium sulfate by decomposition of its free acid content. Small amounts of this sodium sulfate become detached from the coke particles as the charge progresses through the decomposer 2 and the furnace 4 but it is found that this detached material is picked up by the tumbling coke granules and reduced. It is further noted that the recovered sulfate coming from the dryer is in the form of sodium sulfate and is not fusible at the temperature employed in the decomposer 2 but this sodium sulfate is picked up and held by the coated coke granules and is efficiently reduced. A comparatively large proportion of sodium sulfate may be used in the charge along with the niter cake, the sodium sulfate or salt cake preferably being in fairly finely divided or powdered condition. The process may even be operated with salt cake alone, that is, by feeding into the conveyor 1 a mixture of granular coke and powdered salt cake. The salt cake does not fuse and coat the granular coke with a film of sodium sulfate as when niter cake is employed. However when salt cake is used alone the process proceeds in a satisfactory manner and under substantially the same conditions as those required in the use of niter cake. Due to the continuous tumbling of the charge in the revolving decomposer 2 and the furnace 4 the salt cake is picked up by and adheres to the coke granules and is reduced and during the passage of the charge through the reducing furnace it is found that substantially all of the salt has thus been picked up and reduced. The only differences in the process when salt cake or a predominating proportion of salt cake is used instead of niter cake are that the salt cake must be powdered whereas the niter cake need not be powdered and that no sulfur dioxid containing gas is produced in the decomposer 2 from salt cake whereas gas rich in sulfur dioxid is produced in decomposer 2 by the decomposition of the niter cake.

We claim:

1. Process of making sodium sulphide which comprises, reducing sodium sulfate in the form of a molten non-flowing film in contact with carbonaceous material.

2. Process of making sodium sulphide which comprises, coating granules of carbonaceous material with a relatively thin layer of sodium sulfate, and heating and agitating the coated granules.

3. Process of making sodium sulphide which comprises, mixing niter cake and coke, agitating and heating the mixture at a temperature in the neighborhood of 400° C., and raising the temperature of the mixture to about 800° C.

4. Process of making sodium sulphide which comprises, heating a mixture of sodium sulfate and granular carbonaceous material to a temperature of about 800° C., and maintaining the mixture in a granular condition throughout the heating operation.

5. Process of making sodium sulphide which comprises, heating a mixture of granular carbonaceous material and sodium sulfate to a temperature sufficient to reduce the sodium sulfate to sulphide, selectively dissolving sodium sulphide from the reaction product, and returning unconsumed carbonaceous material and unreduced sodium sulfate and other sodium salts to the heating operation.

6. Process of making sodium sulphide which comprises, heating and agitating a mixture of sodium sulfate and granular coke to a temperature of from 800° C. to 1000° C., leaching the heated material with water, separating the resulting sodium sulphide solution from coke and unreduced sulfate and other sodium salts, drying the coke and sulfate and other sodium salts, and returning the same to the heating operation.

7. Process of making sodium sulphide which comprises, agitating a mixture of niter cake and granular petroleum coke while heating the mixture to about 400° C. until the granules of coke are coated with sodium sulfate, and continuing the agitation of the mixture at a temperature of 800° C. to 1000° C. until the bulk of the sodium sulfate is reduced to sodium sulphide.

8. Process of making sodium sulphide which comprises, mixing niter cake with granular carbonaceous material in excess of the quantity sufficient to reduce the sulfate to sulphide, heating and agitating the mixture at a temperature sufficient to cause the coating of the carbonaceous granules with sodium sulfate but insufficient to cause substantial reduction of the sulfate to sulphide, continuing the agitation of the mixture at a temperature sufficient to cause reduction of the sulfate, leaching the reaction product with water, separating the resulting solution of sodium sulphide from sodium sulfate and other sodium salts and carbonaceous material, drying the sodium sulfate and other sodium salts and carbonaceous material, and returning the same to the first named heating and agitating operation.

In testimony whereof, we affix our signatures.

FRANK G. STANTIAL.
JOHN H. CLARKE.